Patented Jan. 31, 1950

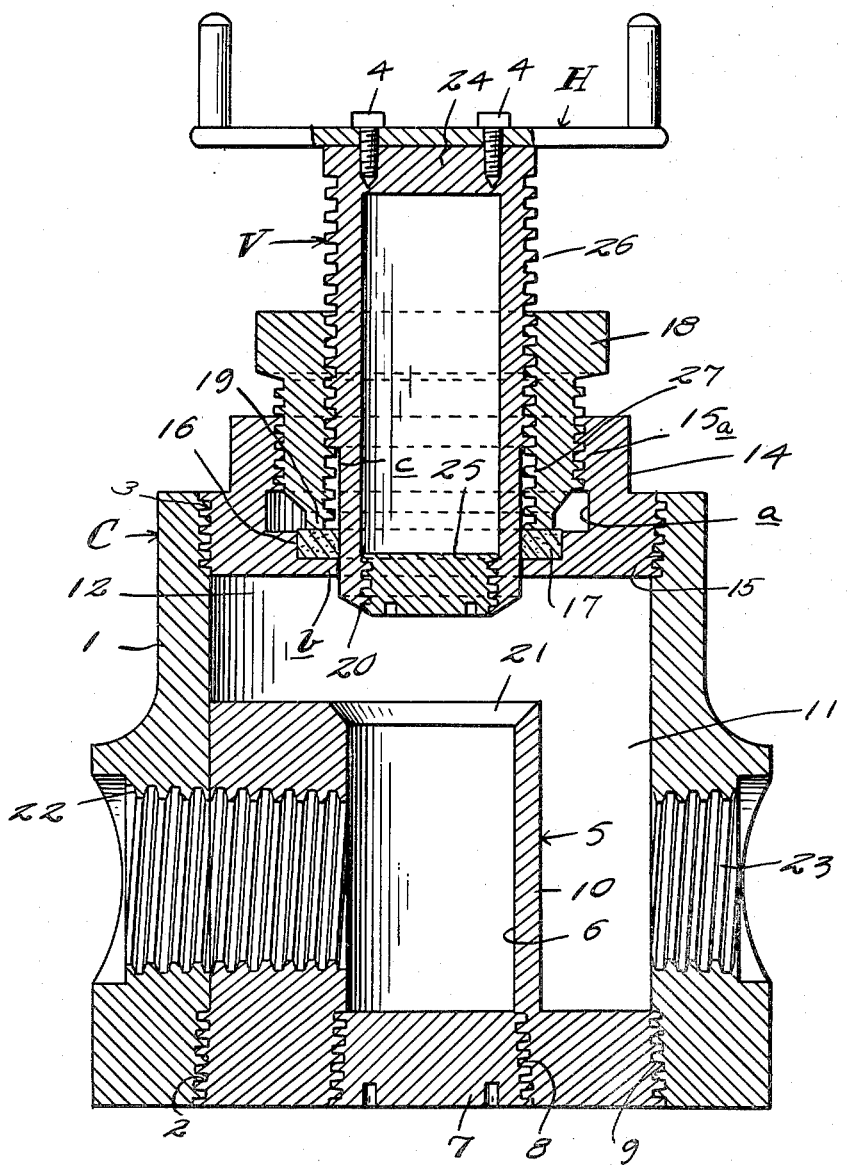

2,496,176

UNITED STATES PATENT OFFICE 2,496,176

VALVE

George V. Powers, Great Bend, Kans.

Application December 22, 1944, Serial No. 569,362

5 Claims. (Cl. 251—50)

This invention relates to valves and it is primarily an object of the invention to provide a valve which is non-corrosive and which is constructed without the use of any metal parts which may be contacted by the fluid flowing through the valve.

It is also an object of the invention to provide a valve wherein the parts thereof are produced from a material that will withstand all corrosive action of salt water and acid produced in conjunction with crude oil and wherein such parts are produced from a material that cannot be cast or molded.

The invention also has for an object to provide a valve including a casing having an internal valve seat and a valve member for coaction with the valve seat threading into the casing and wherein packing for the valve member is positioned below or inwardly of the threads of the valve member and the casing so that no metal part is exposed to the liquid during its flow through the valve or during the opening and closing of the valve.

A still further object of the invention is to provide a valve wherein the different parts thereof are manufactured from a material that can only be produced in cylinder form.

The invention consists in the details of construction and in the combination and arrangement of the several parts of my improved valve whereby certain important advantages are attained and the article rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein is illustrated a view in vertical section taken through a valve constructed in accordance with an embodiment of the invention.

The valve as herein embodied comprises, with one exception, a number of parts which are non-corrosive, the excepted part being the operating handle H for the valve member V to be hereinafter more particularly referred to. This handle member H may be of metal or any material preferred and as herein disclosed this handle member H is secured in place by the lag screws 4.

The other parts of the valve are made of a material that can only be produced in cylindrical form and which cannot be cast or molded. The material employed is known as "Transite" and comprises an admixture of asbestos, ordinary cement, and water. The material can only be manufactured by turning the initially plastic material on a mandrel under hydraulic pressure. The new material is applied to the mandrel in a thin layer and as the mandrel turns the cylinder is enlarged on the outside with each revolution of the mandrel. The water is pressed from the material or cylinder while winding on the mandrel during every revolution of the mandrel. When flat pieces are desired plugs are cut from the sides of cylinders of large radii and, of course, the initial radius of the bore of any piece produced will be determined by the diameter of the mandrel and the numbers of layers applied to the mandrel in the construction of a piece will be determined by the thickness of the wall desired.

The valve comprises a casing C which includes a tubular cylinder member 1 of required thickness and which initially has its opposite ends open. Such ends are interiorly threaded, as at 2, and 3.

One end portion of the member 1 has tightly fitted therein a tubular seat block 5 which extends a material distance into the member 1. This block has a bore 6 which is disposed at the axial center of the member 1 when the block is in position. Initially the opposite ends of the bore 6 are open but in the assembly the outer end portion of the bore 6 is closed by an inserted plug 7 threaded into position, as at 8, or otherwise held in place as preferred. The outer end portion of the block 5 is provided with the external threads 9 for coaction with the internal threads 2 of the member 1. The outer end face of the applied block 5, and the associated outer face of the plug 7, are substantially flush with each other and with the adjacent end face of the member 1.

The inner or inserted end portion of the block 5 has a peripheral portion cut away, as at 10, such portion 10 extending around the block 5 a material distance whereby is provided, when the block 5 is applied, a fluid passageway 11 which is in communication with a fluid chamber 12 within the casing C between the block 5 and the applied plug 14 which closes the second end portion of the member 1. An end portion of this plug 14 is provided with the peripheral threads 15 for coaction with the threads 3 of the member 1.

The plug 14 is initially tubular with its opposite ends open and with the outer portion a interiorly enlarged and internally threaded, as at 15a. The inner or restricted portion b, of the bore of the plug 14, has its outer portion defined by a rabbet 16 in which is fitted the compressible packing 17. Threading from without into the portion a of the bore of the plug 14 is a packing nut 18 having its inserted end portion externally reduced, as at 19, whereby effective contact with the packing 17 is assured to maintain the packing in required sealing contact with the periphery of the inner end portion of the valve member V.

The inserted end of the valve member V is provided with a surrounding bevel face 20 on an angle coincident with that of the angle of the valve seat 21 provided at the inner end portion of the bore 6 of the block 5 whereby the valve member V will have effective seating when extended inwardly into position to close flow through the casing C.

The member 1 of the casing C and the adjacent portion of the applied block 5 have formed therethrough, in a direction radially of the member 1, an inlet port 22 herein disclosed as threaded to allow for the desired coupling with the casing C of a pipe line leading from the source of fluid supply. At a port diametrically opposed to the port 22 the member 1 is provided with an outlet port 23 having direct communication with the passageway 11. This port 23 is also disclosed as threaded to allow proper connection with the casing of a line leading to the desired point of discharge. The ports 22 and 23, but more particularly the port 22, are preferably bored after the block 5 has been applied.

The valve member V may be initially tubular or it may be initially formed with a closed end 24 and with its opposite end open but closed by the plug 25 threaded therein, as shown. The inner portion of the valve member V for a considerable distance therealong has its periphery smooth and unobstructed, as at c, so that the inner portion of the valve member may have movement through the plug 18 and more particularly the packing 17 for requisite coaction with the valve seat 21. The outer portion of the valve member V for a considerable distance therealong is provided with the peripheral threads 26 which coact with the internal threads 27 of the nut 18 so that upon requisite turning of the valve member V the same may be adjusted as desired with respect to its seat 21.

It is to be noted that the packing 17 is positioned entirely inwardly of the threads 26 so that it is not necessary for the threads of the member V to pass into the chamber 12 at any time in the opening or closing of the valve and therefore the fluid passing through the valve casing C will be kept out of contact at all times with the threads 26 and also the threads 27. It is also to be pointed out that the assembly is such wherein the packing nut 18 also serves as the sole support guide for the valve member V.

It is to be pointed out that the form or construction of the present valve is such that the flow pressure on the member V will have a tendency to open the same thus assuring wear being reduced to a minimum.

From the foregoing description it is believed to be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A valve comprising a tubular member initially open at both ends, a tubular seat block initially open at both ends tightly fitting within one end portion of the tubular member, a plug for closing the outer end of the bore of the seat block, the inserted end portion of the block having a peripheral part cut away to provide an interior passageway, the tubular member and the block having an inlet opening therethrough communicating with the bore of the block, said tubular member having a second port in communication with the passageway, a tubular plug for the second end portion of the bore of the tubular member, the outer portion of the bore of said plug being enlarged, packing within the enlarged portion of the bore, a packing nut threading into said enlarged portion of the bore of the second plug for coaction with the packing, and an elongated valve member threading through the packing nut for coaction with the inner end of the bore of the seat block for controlling flow through the valve.

2. The valve as set forth in claim 1 wherein the periphery of the inner portion of the valve member is smooth and unobstructed with the outer end portion of such periphery threaded, the packing being positioned inwardly of the threads of the valve member and of the packing nut.

3. The valve as set forth in claim 1 wherein the periphery of the inner portion of the valve member is smooth and unobstructed with the outer end portion of such periphery threaded, the packing being positioned inwardly of the threads of the valve member and of the packing nut, the packing nut constituting the only mounting for the valve member.

4. A valve comprising a body of tubular form having its ends interiorly threaded, a circular plug block threaded in and closing one of said ends, the plug terminating at its inner end short of the other end of the body and having an axial passage therethrough which is coaxial with the body, means closing the outer end of the passage, the inner end of the passage having its edge beveled to form a seat, joining aligned bores formed through the body and the plug and opening into the passage, a second bore formed through the body only and communicating directly with the interior thereof, a tubular interiorly and exteriorly threaded guide threaded into the other end of the body, a relatively long cylindrical valve member extending through said guide in alignment with the passage, the inner end of the valve member being beveled to fit on said seat, and threaded means coupling the valve member with the guide for effecting axial movement of the member relative to said seat.

5. A valve comprising a body of tubular form having its ends interiorly threaded, a circular plug block threaded in and closing one of said ends, the plug terminating at its inner end short of the other end of the body and having an axial passage therethrough which is coaxial with the body, means closing the outer end of the passage, the inner end of the passage having its edge beveled to form a seat, joining aligned bores formed through the body and the plug and opening into the passage, a second bore formed through the body only and communicating directly with the interior thereof, a tubular interiorly and exteriorly threaded guide threaded into the other end of the body, the inner end of the guide being of reduced diameter, a packing within the guide, a relatively long cylindrical valve member extending through the guide and snugly fitting in said reduced inner end and passing through the packing, means threaded in the guide for compressing the packing against the valve member, and a threaded connection between said means and the valve member outwardly of the packing, said valve member being axially aligned with said passage and having its inner end formed to engage said seat.

GEORGE V. POWERS.

REFERENCES CITED

The following references are of record in the file of this patent:

UNITED STATES PATENTS

| Number | Name | Date |
|---|---|---|
| 351,828 | Bushnell | Nov. 2, 1886 |
| 767,600 | Sjoberg | Aug. 16, 1904 |
| 837,169 | Winslow | Nov. 27, 1906 |
| 1,714,606 | Lotz | May 28, 1929 |
| 2,019,257 | Gibbs | Oct. 29, 1935 |
| 2,263,292 | Edwards | Nov. 18, 1941 |
| 2,310,558 | Teeters | Feb. 9, 1943 |